United States Patent [19]
Beers

[11] Patent Number: 4,742,905
[45] Date of Patent: May 10, 1988

[54] POWERED ACCUMULATION CONVEYOR

[76] Inventor: Gregory C. Beers, 1504 Verdure Cir., Birmingham, Ala. 35216

[21] Appl. No.: 919,362

[22] Filed: Oct. 16, 1986

[51] Int. Cl.$^4$ .............................................. B65G 17/24
[52] U.S. Cl. .................................... 198/779; 198/841
[58] Field of Search ............... 198/779, 780, 624, 817, 198/841

[56] References Cited

U.S. PATENT DOCUMENTS

| | | | |
|---|---|---|---|
| 3,080,955 | 3/1963 | Fennell | 199/779 |
| 3,604,554 | 9/1971 | Martz | 198/779 |
| 3,885,837 | 5/1975 | Mellor | 198/841 |
| 3,916,797 | 11/1975 | Block et al. | 198/779 |
| 4,479,572 | 10/1984 | Merz | 198/624 |
| 4,589,845 | 5/1986 | Naohara et al. | 198/841 |

Primary Examiner—Joseph E. Valenza

[57] ABSTRACT

A powered conveyor apparatus for conveying boards. When the boards are being conveyed, they rest on the molded wheels. The wheels remain static while the boards are being conveyed. When the boards are stopped on the conveyor (FIG. 2), the molded wheels rotate freely (See FIG. 2, Item No. 6) under the boards. This allows the conveyor to run while boards remain in a static position on the conveyor.

1 Claim, 4 Drawing Sheets

POWERED ACCUMULATION CONVEYOR

SUMMARY

The Powered Accumulation Conveyor allows the boards that are being conveyed to rest on the wheels (FIG. 2.1). A stop can be raised and the board can be held in position while the conveyor continues to run. The conveyor can run without damaging the board due to the fact that the rotating wheel (FIG. 4.1) will rotate freely underneath the board. This additionally allows more than one (board) to accumulate on the powered conveyor. These boards can accumulate with a minimum amount of pressure between each board which will protect the quality of the board and allow accumulation of a higher quantity of boards.

DETAILED DESCRIPTION OF POWERED ACCUMULATION CONVEYOR

Figure 1:
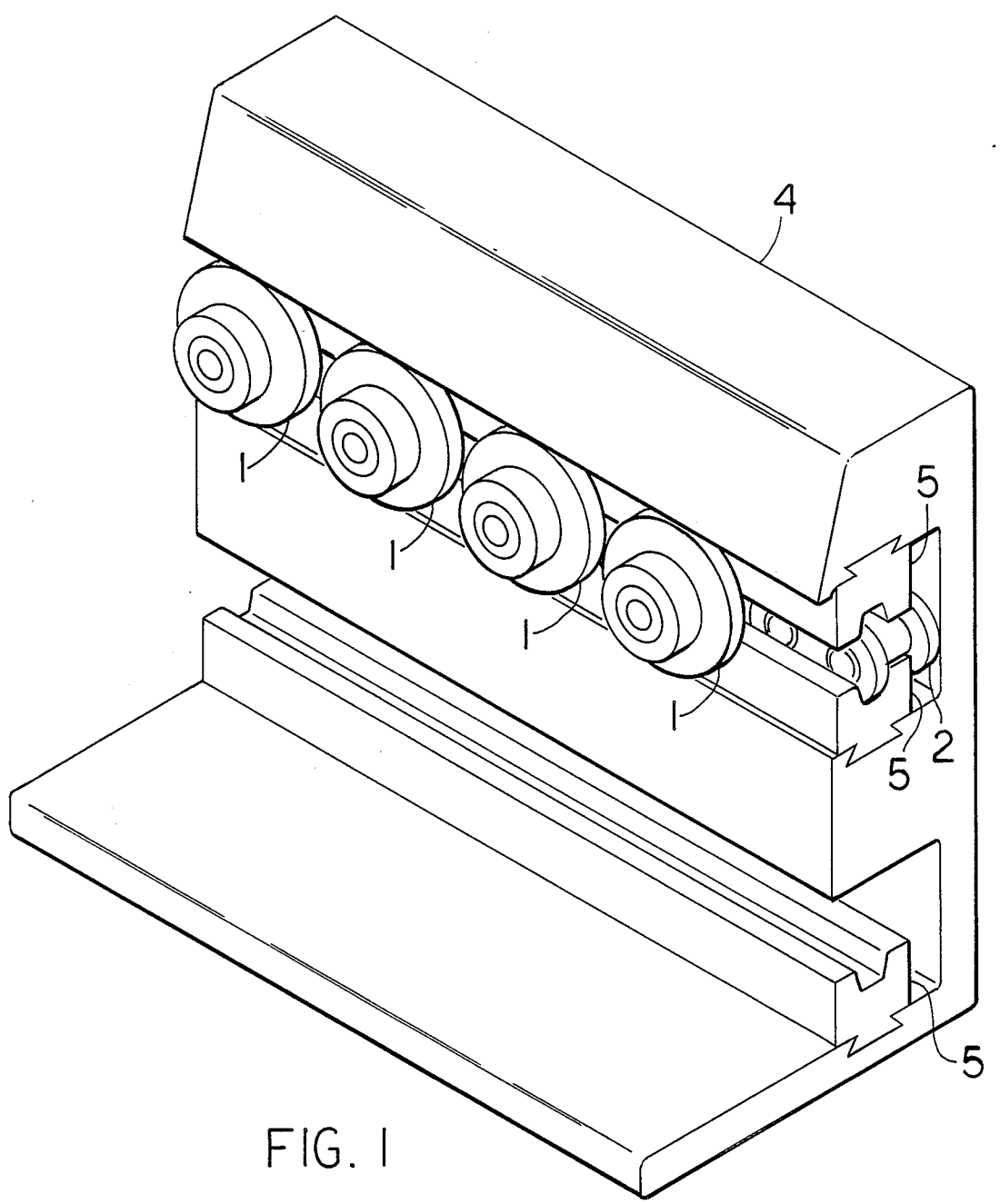
FIG. 1 is an isometric view of the Powered Accumulation Conveyor showing each part in relation to the conveyor.
Figure 2:
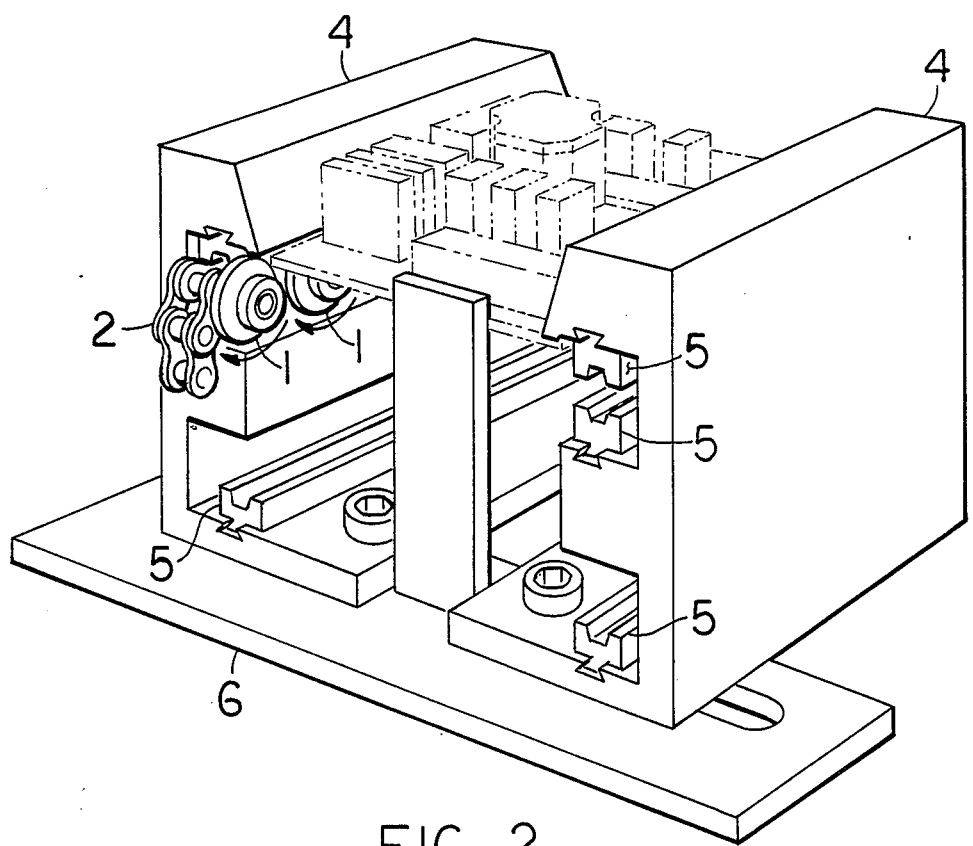
FIG. 2 is an isometric view of the Powered Accumulation Conveyor showing the width adjustability feature and how the wheels turn freely when the boards are stopped on the conveyor while the conveyor is still running.
Figure 4:
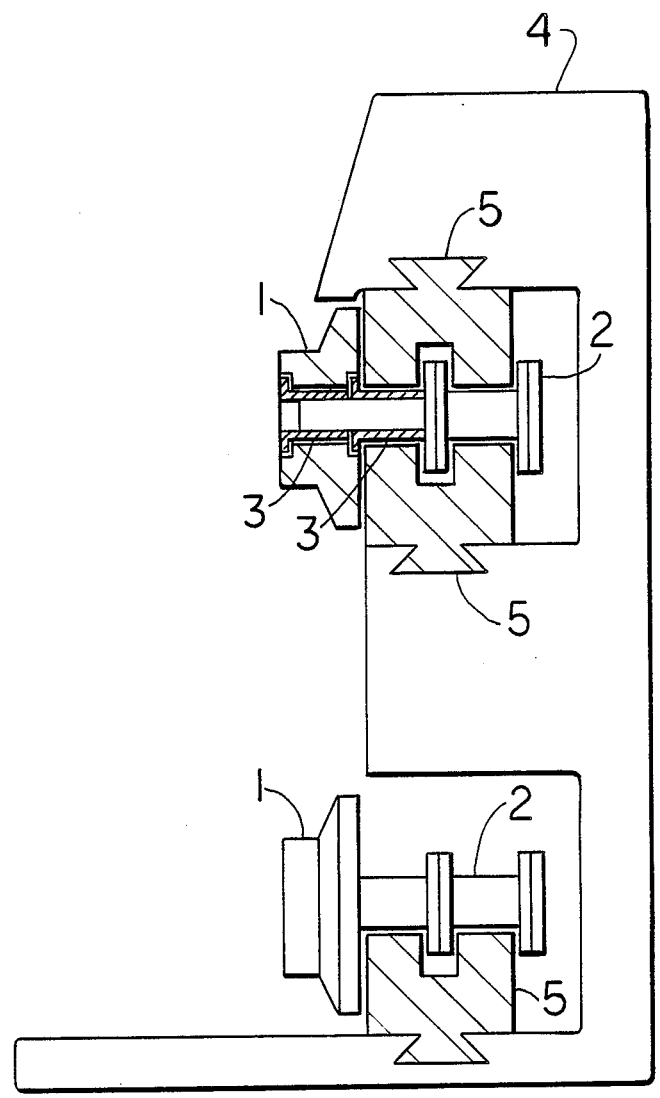
FIG. 4 is a section view of the brass sleeve bearings showing their relationship to the chain and wheels.

The Printed Circuit Board industry relies on many types of transportation conveyors during manufacturing and assembly of the printed circuit boards. These conveyors are typically used between machines, and at manual and robotic stations. The Powered Accumulation Conveyor is a unique conveyor for the Printed Circuit Board industry in the following respects:

Wheels (See FIG. 1, Item No. 1; FIG. 2, Item No. 1; FIG. 4, Item No. 1) are injection molded nylon with carbon and teflon additives. The wheels have tapered sides for board alignment. The wheels provide a clean, static conducting carrier to convey the boards.

Chain (See FIG. 1, Item No. 2) is Number 35 chain with special length extended pins (See FIG. 4, Item No. 7) with brass sleeve bushings for wheel bearings. This provides free spinning wheels which enables accumulation of boards with almost no back pressure from other boards while accumulating.

Wear track (See FIG. 1, Item No. 5; FIG. 4, Item No. 5) is extruded from Geon 87419 which provides an easily replaceable smooth chain guide, with extended wear life.

Conveyor track (see FIG. 1, Item No. 4) is an anodized aluminum extrusion with a wide body for accurate alignment.

Brass sleeve bearing (See FIG. 1, Item No. 3 and FIG. 4, Item No. 3) is made up of twin brass sleeves (FIG. 4, Item No. 3). Each sleeve has a small collar. One sleeve is pressed onto the extended pin portion of the RC-35 chain to act as a spacer between the wheel and the chain. The other sleeve is inserted into the inside diameter of the wheel and pressed onto the outer half of the extended pin on the chain. The second sleeve and wheel are pressed onto the pin until they rest next to the first sleeve which was pressed onto the extended pin (FIG. 4, Item No. 3).

Figure 3:
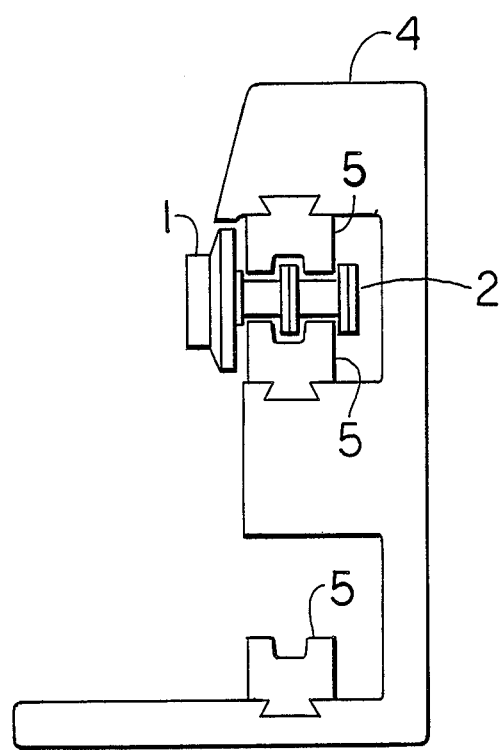
FIG. 3 is a section view of the Powered Accumulation Conveyor showing the ease of loading the boards on the tapered aluminum extrusion and the tapered molded wheels.

The Powered Accumulation Conveyor helps eliminate board damage by allowing the board to be conveyed in a tapered cradle; the Powered Accumulation Conveyor helps eliminate foreign material from getting on boards since the boards ride on free spinning wheels (FIG. 1, Item No. 1; FIG. 2, Item No. 1; FIG. 4, Item No. 1) and do not make contact with the chain. The Powered Accumulation Conveyor allows boards to accumulate prior to manual or robotic work stations, with the ability to release one board at a time; conveyor track and wheels are designed for operator ease in placing and removing boards (FIG. 3; note slope) the conveyor can be manually adjusted from 6" to 30" wide with a slotted tie plate (FIG. 2, Item No. 6)

I claim:

1. A workpiece conveyor system for transporting circuit boards or the like comprising:

two laterally spaced rail means having upper portions with opposed downwardly converging sides to permit ease of article loading of the conveyor system, each said rail means is formed of extruded aluminum, each said rail means having two extruded wear tracks connected to the middle of said rail means in vertical alignment with each other, each said rail means having a third extruded wear track connected to the lower portion of said rail means, each of said wear tracks are connected to said rail means by dove tail type connections; an endless roller chain mounted for movement on its conveying run between the two vertically aligned wear tracks which are mounted on the middle portion of each of said rail means and having its return run guided by the third wear track mounted on the lower portion of said rail means, each said endless roller chain having a plurality of pins which extend toward the opposite endless roller chain spaced along the length of said roller chain; each extended pin having a brass sleeve bearing mounted thereon, said brass sleeve freely rotatably mounting a static conducting injection molded article supporting wheel, said wheel is tapered to reduce in diameter in the axial direction away from its supporting endless roller chain; means for driving said endless roller chains so that said wheels will support and convey the article unless the article is stopped by some external force at which time said supporting wheels will rotate relative to the article as the pass under the article while said roller chains are driven.

* * * * *